United States Patent
Devlin et al.

(10) Patent No.: US 12,016,484 B2
(45) Date of Patent: Jun. 25, 2024

(54) FROTH HEATERS

(71) Applicant: B/E Aerospace, Inc., Winston Salem, NC (US)

(72) Inventors: Byron Devlin, Kansas City, MO (US); Anthony Serfling, Kansas City, MO (US); Kirsten Frogley, Shawnee, KS (US); Keith Debald, Gardner, KS (US)

(73) Assignee: B/E AEROSPACE, INC., Winston Salem, NC (US)

( * ) Notice: Subject to any disclaimer, the term of this patent is extended or adjusted under 35 U.S.C. 154(b) by 418 days.

(21) Appl. No.: 17/161,527

(22) Filed: Jan. 28, 2021

(65) Prior Publication Data

US 2022/0233017 A1    Jul. 28, 2022

(51) Int. Cl.
| | |
|---|---|
| A47J 31/36 | (2006.01) |
| A47J 31/46 | (2006.01) |
| A47J 31/54 | (2006.01) |
| F24H 1/10 | (2022.01) |
| F24H 1/14 | (2022.01) |

(52) U.S. Cl.
CPC ......... *A47J 31/3685* (2013.01); *A47J 31/465* (2013.01); *A47J 31/542* (2013.01); *F24H 1/105* (2013.01); *F24H 1/14* (2013.01); *F24H 2250/00* (2013.01)

(58) Field of Classification Search
CPC .... A47J 31/3685; A47J 31/465; A47J 31/542; F24H 1/105; F24H 1/14; F24H 1/142; F24H 2250/00; F24H 2250/02; F24H 9/0015; F24H 9/139; F24H 9/1818; F24H 9/2014; F24H 9/2028; H05B 2203/021

See application file for complete search history.

(56) References Cited

U.S. PATENT DOCUMENTS

| | | | |
|---|---|---|---|
| 5,265,318 A * | 11/1993 | Shero | B23P 11/025 392/491 |
| 7,286,752 B2 | 10/2007 | Gourand | |
| 9,398,829 B2 | 7/2016 | Etter et al. | |
| 10,772,462 B2 | 9/2020 | Iacobucci et al. | |
| 2007/0102415 A1* | 5/2007 | Ko | H05B 3/44 219/385 |

(Continued)

FOREIGN PATENT DOCUMENTS

| | | |
|---|---|---|
| EP | 0345528 A1 | 12/1989 |
| WO | 2007039683 A1 | 4/2007 |

(Continued)

OTHER PUBLICATIONS

Extended European Search Report issued by Examiner of the European Patent Office, dated Jul. 8, 2022, in corresponding European Patent Application No. 22153923.2.

*Primary Examiner* — Justin C Dodson
(74) *Attorney, Agent, or Firm* — SNELL & WILMER L.L.P.

(57) ABSTRACT

A froth heater can include an outer case defining an inner cavity, an inlet in fluid communication with the inner cavity, and an outlet in fluid communication with the inner cavity. The froth heater can include a heater core inserted into inner cavity and configured to form a flow path between an inner wall of the outer case and the heater core between the inlet and the outlet. The heater core can include a core cavity configured to receive a heater therein to heat the heater core.

14 Claims, 6 Drawing Sheets

(56) References Cited

U.S. PATENT DOCUMENTS

| | | | | |
|---|---|---|---|---|
| 2007/0143914 A1* | 6/2007 | Shirai | ................... | F24H 9/2028 |
| | | | | 4/420.2 |
| 2011/0041705 A1* | 2/2011 | Reichl | ..................... | H05B 3/40 |
| | | | | 99/323.3 |
| 2012/0103968 A1* | 5/2012 | Lu | ............................ | F24H 1/43 |
| | | | | 219/429 |
| 2014/0050466 A1* | 2/2014 | Giffels | .................... | H05B 3/22 |
| | | | | 392/491 |
| 2018/0271319 A1 | 9/2018 | Gatti et al. | | |

FOREIGN PATENT DOCUMENTS

| | | | | | |
|---|---|---|---|---|---|
| WO | | 2013041391 A1 | 3/2013 | | |
| WO | WO-2013034270 A1 | * | 3/2013 | ............ | F24H 1/121 |
| WO | | 2017200816 A1 | 11/2017 | | |

\* cited by examiner

FROTH HEATERS

FIELD

This disclosure relates to froth heaters (e.g., for espresso machines), e.g., for aircraft.

BACKGROUND

Traditional heater designs suffer from poor resilience to scale buildup. Any scale in the small diameter stainless steel tube creates blockage that prevents steam/water flow and reduces heat transfer from the heater block to the water, producing lower steam and froth quality. Because of the reduced or block flow, and blind water path, it can be nearly impossible to clean at a repair facility. Cast heater blocks are also expensive and difficult to produce. Such blocks are susceptible to casting voids and imperfections that decrease the performance of the heater. Additionally, the current heater designs have a poor resistance temperature detector (RTD) location, which leads to delayed thermal response of the sensor, and temperature overshoot of the froth heater.

Current heaters are also expensive to manufacture. The coiled steel tube used therein is difficult to fabricate, and the casting is expensive and prone to issues like air pockets and porosity that can lead to poor heating performance. Traditional designs include a constant cross-section tube that is permanently encased and makes scale removal impossible except to treat it with solution. It is difficult to detect the amount of scale buildup, and the stainless steel material is not as efficient at heat transfer.

Such conventional methods and systems have generally been considered satisfactory for their intended purpose. However, there is still a need in the art for improved froth heaters. The present disclosure provides a solution for this need.

SUMMARY

A froth heater can include an outer case defining an inner cavity, an inlet in fluid communication with the inner cavity, and an outlet in fluid communication with the inner cavity. The froth heater can include a heater core inserted into inner cavity and configured to form a flow path between an inner wall of the outer case and the heater core between the inlet and the outlet. The heater core can include a core cavity configured to receive a heater therein to heat the heater core.

In certain embodiments, the froth heater can include the heater disposed within the core cavity. The heater can be any suitable heater (e.g., an electric resistive heater) configured to fit within the core cavity (e.g., a cylindrical channel).

The heater core can include one or more channels defined on an outer diameter thereof. The flow path can be defined by the inner wall of the outer case and the one or more channels.

In certain embodiments, the one or more channels can be circumferentially defined around the heater core. In certain embodiments, the one or more channels can include a reducing flow area from the inlet toward the outlet. In certain embodiments, the one or more channels can include a first flow area at a first axial fraction of the heater core, a second flow area less than the first flow area at least at a second axial fraction of the heater core.

In certain embodiments, the one or more channels includes circumferential rings in fluid communication with adjacent circumferential rings via one or more axial passageways defined through diving walls. In certain embodiments, the circumferential rings can be defined in the first axial fraction of the heater core. In certain embodiments, a spiral channel can be defined at least in the second axial fraction of the heater core.

In certain embodiments, the circumferential rings can be defined along the entire axial length of the heater core between the inlet and the outlet. The one or more channels can include a third flow area (e.g., less than the second flow area) at a third axial fraction of the heater core such that there is a step down in flow area at each axial fraction.

The inner cavity can be defined through the outer case to form a first opening and a second opening. The froth heater can further include a first enclosure plate disposed over the first opening and configured to prevent movement of the heater core and the heater through the first opening.

The froth heater can include a second enclosure assembly disposed over the second opening and configured to prevent movement of both the heater core and the heater through the first opening in a first state, and to allow the heater to be removed through the second opening while continuing to prevent movement of the heater core through the second opening in a second state. For example, the second enclosure assembly can include a wide plate attached to the outer casing configured to allow the heater to be removed through the second opening while continuing to prevent movement of the heater core through the second opening, and a narrow plate disposed over the wide plate configured to prevent motion of the heater through the second opening. In certain embodiments, in the first state, the narrow plate can be disposed over the wide plate, and in the second state, the narrow plate can be removed from the wide plate.

In certain embodiments, the narrow plate can be configured to share one or more shared fasteners with the wide plate. The one or more shared fasteners can be less than all fasteners used to attach the wide plate to the outer casing such that when the shared fasteners are removed, the narrow plate can be removed from the wide plate while the wide plate remains attached to the outer casing. For example, the wide plate can be attached to the outer casing with two independent fasteners, and two shared fasteners diametrically opposed from each other.

The froth heater can include one or more seals disposed at each end of the heater core to seal the heater core against the first enclosure plate and/or the inner wall at a first end, and to seal the heater core against the wide plate and/or the inner wall at a second end. The one or more seals can include a dual seal arrangement at each end of the heater core, for example. The dual seal arrangement can include a face seal configured to be compressed between the heater core and a respective enclosure plate and/or the inner wall. In certain embodiments, each face seal is not nested in the heater core. The dual seal arrangement at each end of the heater core can include a radial seal nested in a seal channel of the heater core and configured to provide a sealing force less than the face seal to allow the heater core to slide relative to the outer casing.

The dual seal arrangement can have a different sizes at each end of the heater core to allow low friction insertion and removal. The outer casing can include a section of reduced inside diameter for the reduced diameter of one of the ring seals.

In certain embodiments, the outer casing can include a temperature sensor opening disposed at or near the inlet (e.g., configured to receive an RTD sensor to sense a temperature of fluid within the flow channel). In certain embodiments, the heater core and the outer casing can be made of aluminum.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
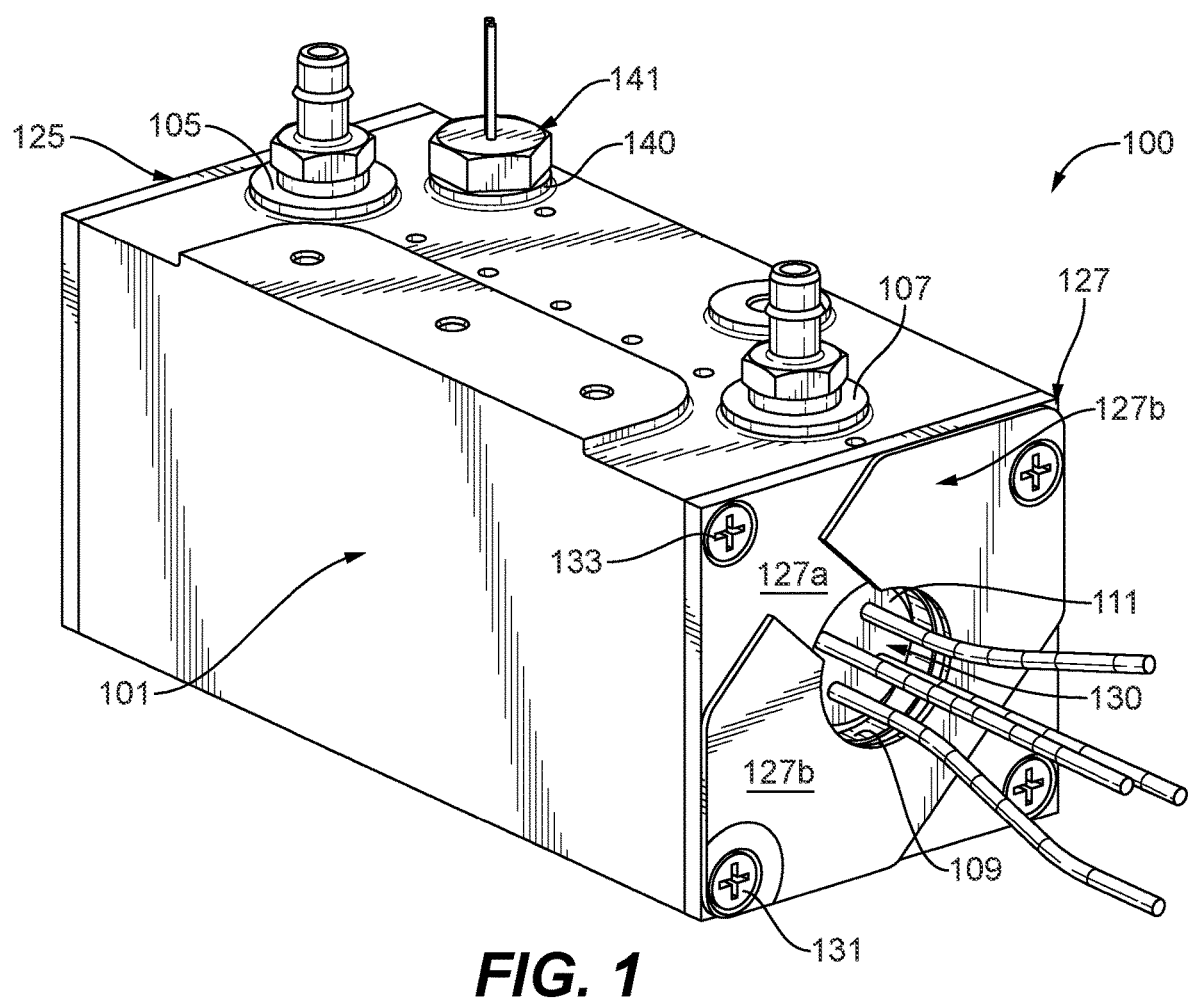
FIG. 1 is a perspective view of an embodiment of a froth heater in accordance with this disclosure, showing a heater disposed and retained therein having heater wires emanating therefrom.

Reference will now be made to the drawings wherein like reference numerals identify similar structural features or aspects of the subject disclosure. For purposes of explanation and illustration, and not limitation, an illustrative view of an embodiment of froth heater in accordance with the disclosure is shown in FIG. 1 and is designated generally by reference character 100. Other embodiments and/or aspects of this disclosure are shown in FIGS. 2-6. Certain embodiments described herein can be used to provide steam for an espresso machine, for example, or for any other suitable use.

Referring to FIGS. 1-4, a froth heater 100 can include an outer case 101 defining an inner cavity 103 (e.g., a cylindrical channel defined through the outer case 101). The outer case 101 can include an inlet 105 in fluid communication with the inner cavity 103, and an outlet 107 in fluid communication with the inner cavity 103. The froth heater 100 can include a heater core 109 inserted into inner cavity 103 and configured to form a flow path between an inner wall 101a of the outer case 101 and the heater core 109 between the inlet 105 and the outlet 107. The heater core 109 can include a core cavity (e.g., defined by an inner wall 109a through a center of the heater core 109 and configured to receive a heater 111 therein to heat the heater core 109).

In certain embodiments, the froth heater 100 can include the heater 111 disposed within the core cavity. The heater 111 can be any suitable heater(s) (e.g., an electric resistive heater) configured to fit within the core cavity(s) (e.g., a cylindrical channel).

The heater core 109 can include one or more channels 113 defined on an outer diameter thereof. The flow path 113 can be defined by the inner wall 101a of the outer case and the one or more channels 113, for example.

In certain embodiments, the one or more channels 113 can be circumferentially defined around the heater core 109. In certain embodiments, the one or more channels 113 can include a reducing flow area from the inlet 105 toward the outlet 107. In certain embodiments, the one or more channels 113 can include a first flow area at a first axial fraction 115a (e.g., an upstream third) of the heater core, a second flow area less than the first flow area at least at a second axial fraction 115b (e.g., a downstream two thirds) of the heater core 109. The flow path can be made to increase turbulence (e.g., by virtue of openings between ring, or other suitable turbulence inducing features) to promote scale to drop out of the water/steam mixture in a preferential area.

In certain embodiments, the one or more channels 113 can include circumferential rings 117 in fluid communication with adjacent circumferential rings 117 via one or more axial passageways 119 defined through diving walls 121. In certain embodiments, the circumferential rings 117 can be defined in the first axial fraction 115a of the heater core 109. In certain embodiments, a spiral channel 123 can be defined at least in the second axial fraction 115b of the heater core 109.

Figure 5:
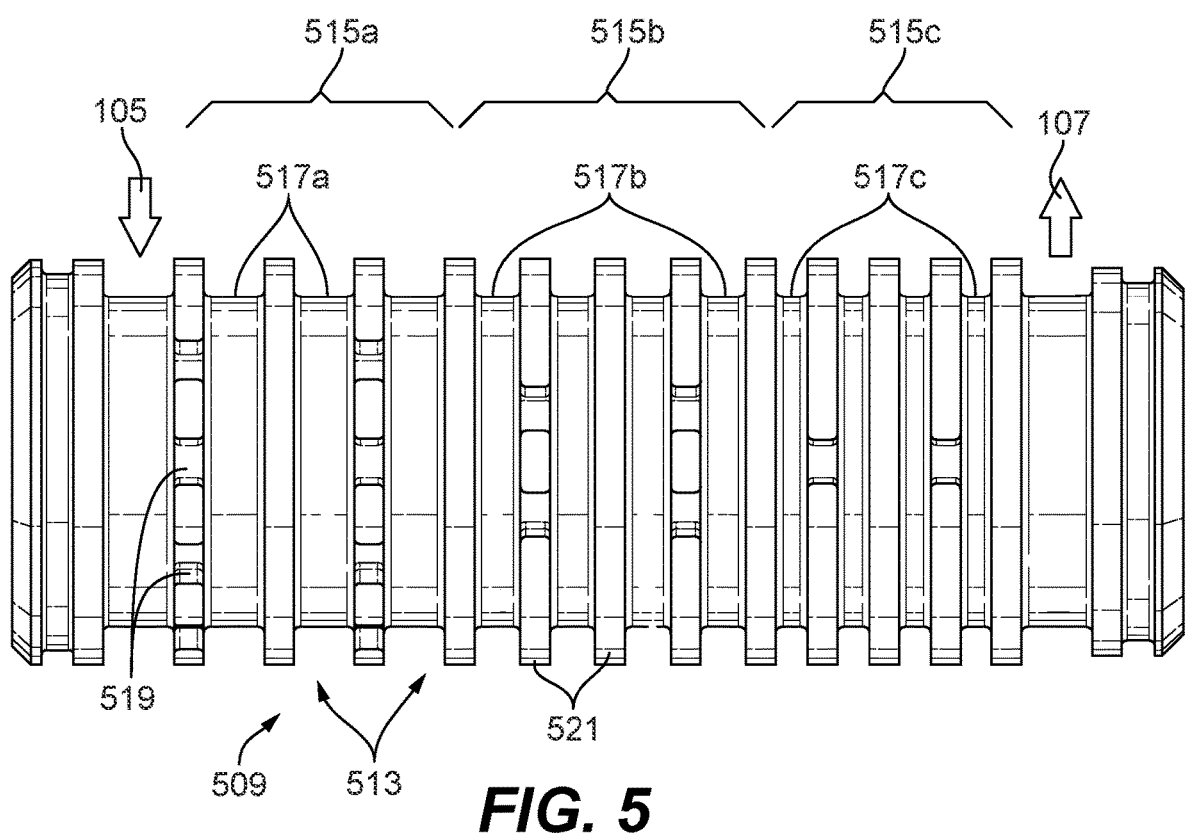
FIG. 5 is an elevation view of an embodiment of a heater core in accordance with this disclosure.
Figure 6:
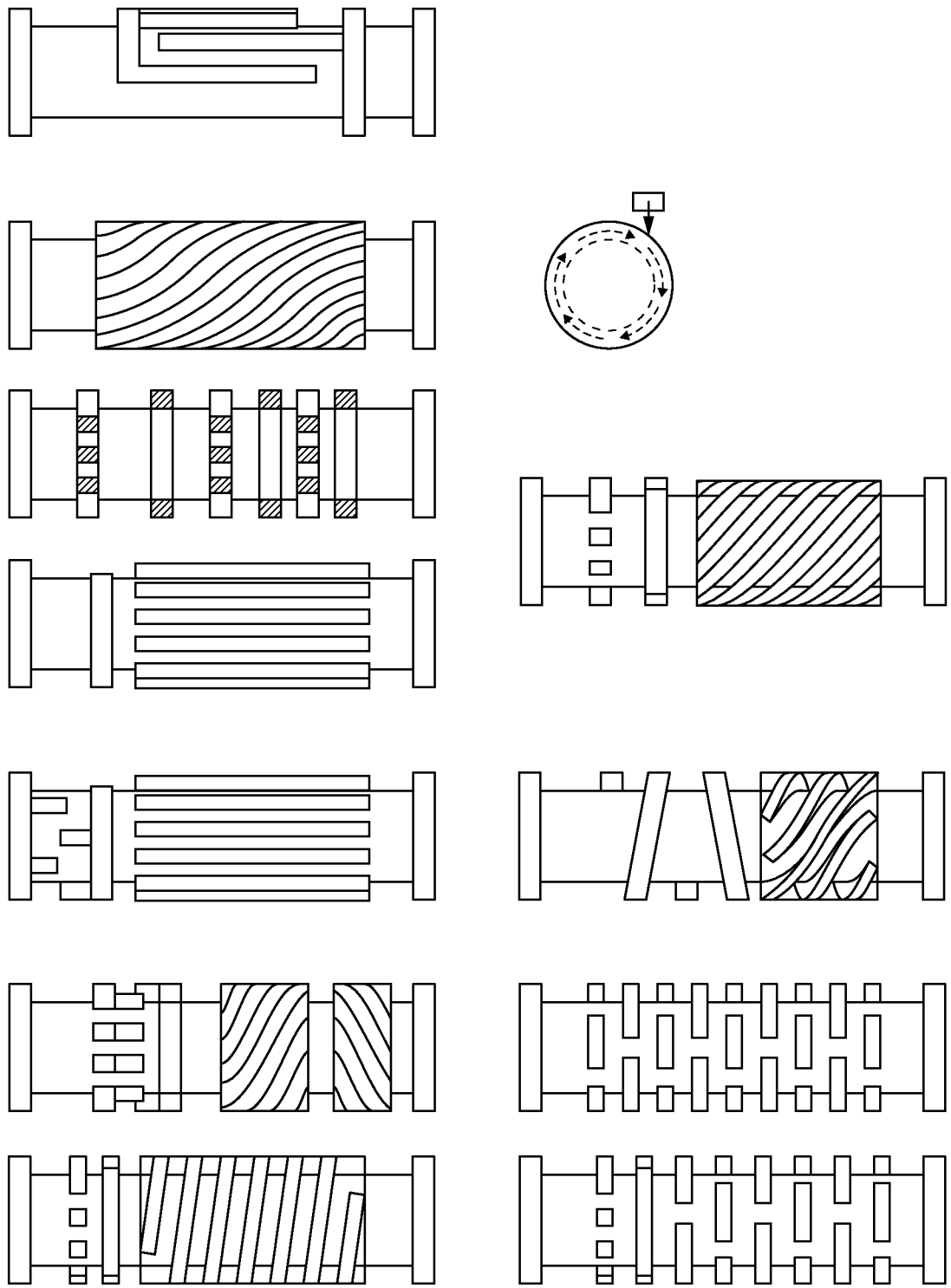
FIG. 6 illustrates a plurality of embodiments of a heater core in accordance with this disclosure.

In certain embodiments, referring to FIG. 5, the circumferential rings 517a, b, c can be defined along the entire axial length of the heater core 509 between the inlet 105 and the outlet 107. As shown in FIG. 5, the one or more channels 513 can include a first flow area at a first axial fraction 515a, a second flow area at a second axial fraction 515b, and a third flow area (e.g., less than the second flow area) at a third axial fraction 515c of the heater core 109 such that there is a step down in flow area at each axial fraction (e.g., a transition or step at each axial fraction as shown). In certain embodiments, a first third can be about double to about 1.5 times the flow size of last third.

As shown, at each axial fraction 515a, b, c, there can be a step down in the number of passthroughs 519 through walls 521. The passthroughs 519 can be disposed 180 degrees apart on adjacent walls 521, e.g., as shown (e.g., to require flow to traverse the entire circumference before passing through the next axial passthrough 519). Any other suitable arrangement and/or transition scheme is contemplated herein.

While certain embodiments of heater cores 109, 509 are shown in FIGS. 1-5, any suitable heater core in accordance with this disclosure is contemplated herein. For example, referring to FIG. 6, a plurality of embodiments of heater cores showing various flow paths, channels, walls, etc. are shown.

Figure 2:
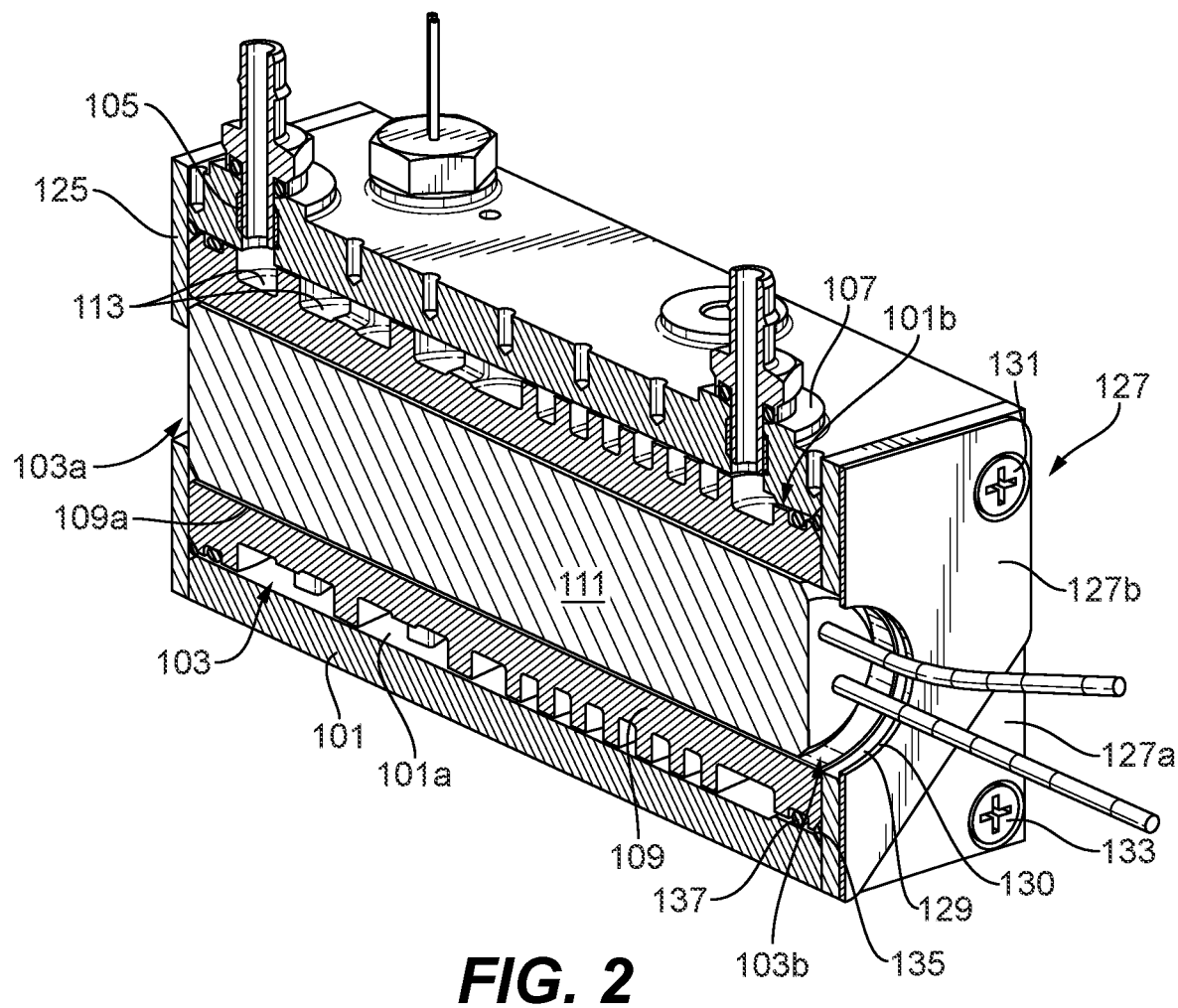
FIG. 2 is a perspective cross-sectional view of the embodiment of FIG. 1.

As shown in FIG. 2, the inner cavity 103 can be defined through the outer case 101 to form a first opening 103a and a second opening 103b. The froth heater 100 can further include a first enclosure plate 125 disposed over the first opening 103a and configured to prevent movement of the heater core 109, 509 and the heater through the first opening 103a. The first enclosure plate 125 can be attached to the outer casing 101 with one or more suitable fasteners (e.g., one or more screws, e.g., similar as shown in FIG. 1).

The froth heater 100 can include a second enclosure assembly 127 disposed over the second opening 103b and configured to prevent movement of both the heater core 109, 509 and the heater 111 through the second opening 103b in a first state (e.g., as shown in FIG. 2), and to allow the heater 111 to be removed through the second opening 103b while continuing to prevent movement of the heater core 109, 509 through the second opening 103b in a second state (e.g., with only a portion of the assembly 127 removed). For example, the second enclosure assembly 127 can include a wide plate 127a attached to the outer casing 101 configured to allow the heater 111 to be removed through the second opening 103b while continuing to prevent movement of the heater core 109, 509 through the second opening 103b. The wide plate 127a can include a wide opening 129 sized to allow the heater 111 to pass therethrough, but not large enough to allow the heater core 109, 509 to pass therethrough.

The second enclosure assembly 127 can also include a narrow plate 127b disposed over the wide plate 127a and configured to prevent motion of the heater 111 through the second opening 103b. In certain embodiments, in the first state (e.g., as shown in FIG. 2), the narrow plate 127b can be disposed over the wide plate 127a, and in the second state, the narrow plate 127b can be removed from the wide plate 127a (e.g., while leaving the wide plate 127a attached to the outer casing 101). For example, the narrow plate 127b can include a narrow opening 130 sized to not allow the heater 111 to pass therethrough, thereby causing the narrow plate 127b to block the heater 111 from removal from the interior cavity 103 while the narrow plate 127b is installed. The narrow opening 130 can be sized to allow one or more heater wires to pass therethrough, and thus can be a heater removal plate.

In certain embodiments, the narrow plate 127b can be configured to share one or more shared fasteners 131 with the wide plate 127a. The one or more shared fasteners 131 can be less than all fasteners (e.g., 2 of 4 fasteners) used to attach the wide plate 127a to the outer casing 101 such that when the shared fasteners 131 are removed, the narrow plate 127b can be removed from the wide plate 127a while the wide plate 127a remains attached to the outer casing 101. For example, the wide plate 127a can be attached to the outer casing 101 with two independent fasteners 133, and two shared fasteners 131 diametrically opposed from each other.

Figure 3:
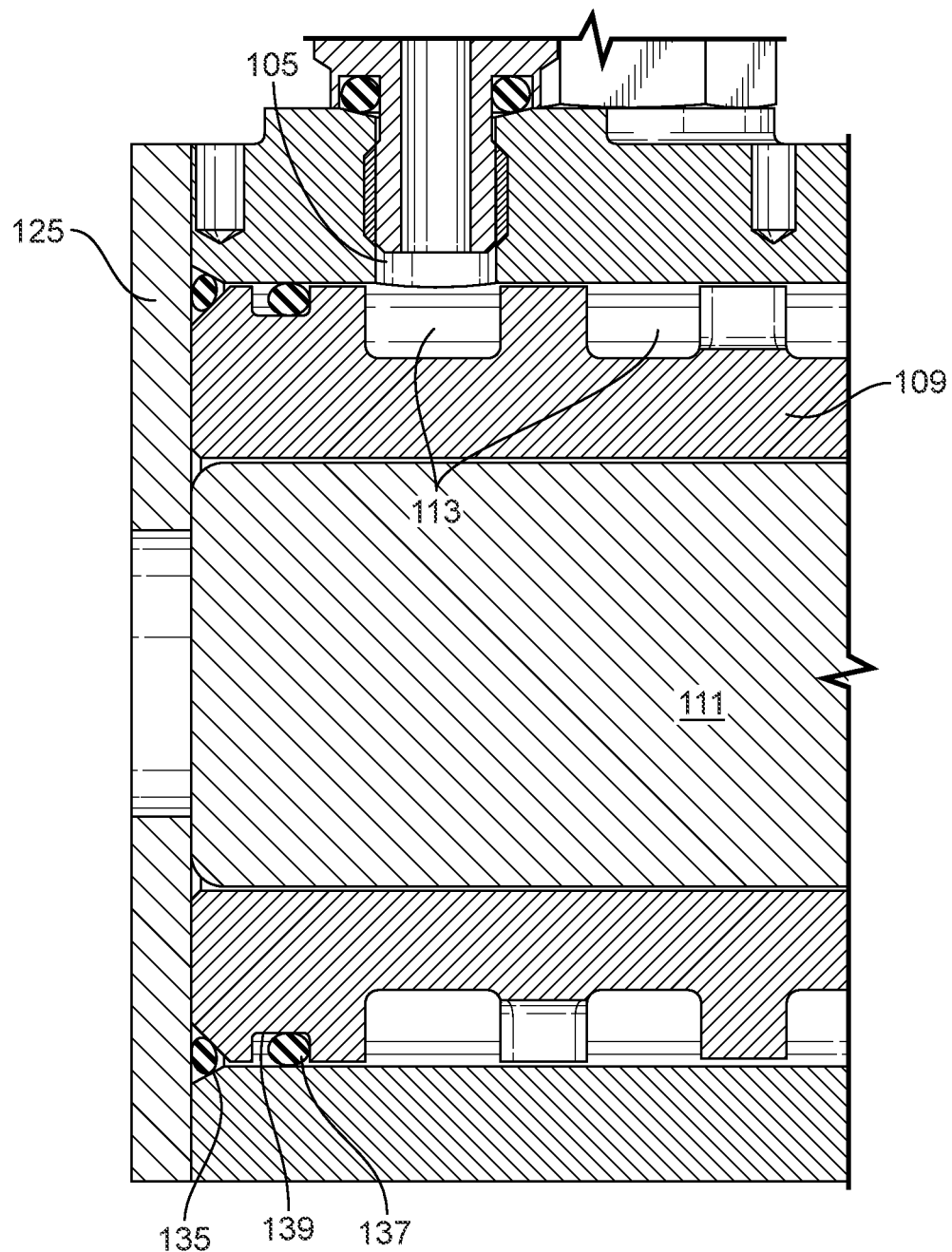
FIG. 3 is cross-sectional view of a portion of the embodiment of FIG. 1.
Figure 4:
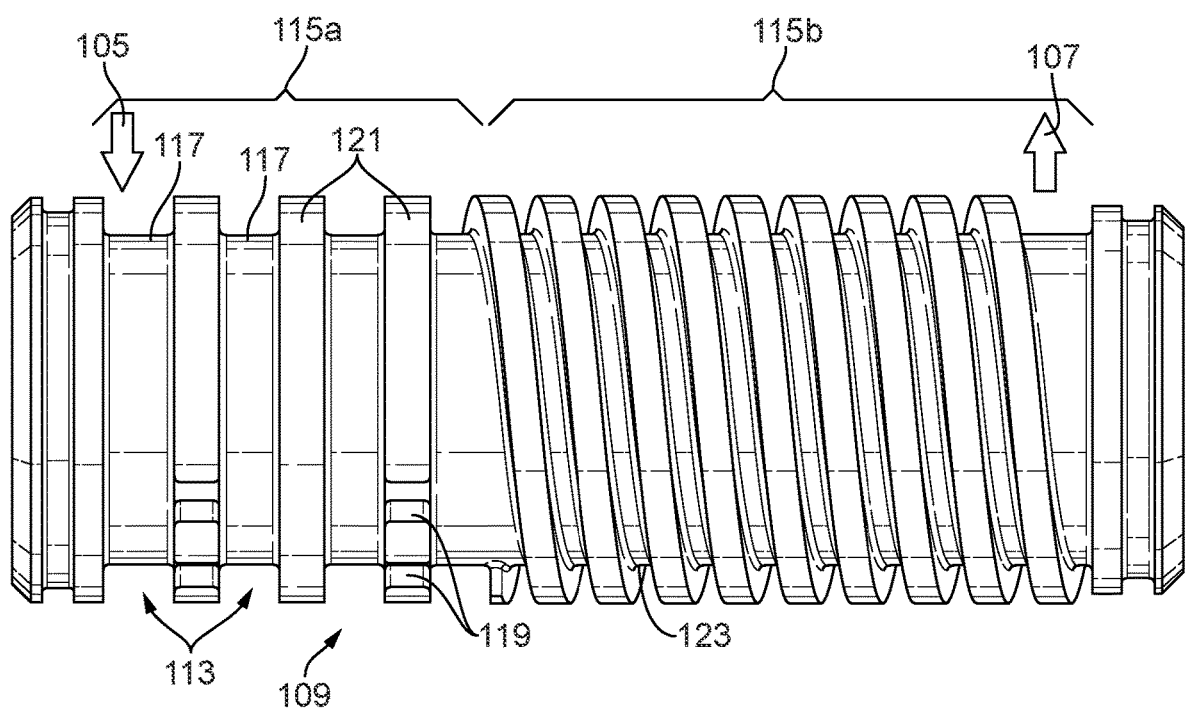
FIG. 4 is an elevation view of an embodiment of a heater core in accordance with this disclosure, e.g., as shown in the embodiment of FIG. 1.

The froth heater 100 can include one or more seals 135, 137 disposed at each end of the heater core 109 to seal the heater core 109 against the first enclosure plate 125 and/or the inner wall 101a at a first end (e.g., as shown in FIG. 3), and to seal the heater core 109 against the wide plate 127a and/or the inner wall 101a at a second end (e.g., proximate the second opening 103b). The one or more seals 135, 137 can include a dual seal arrangement (e.g., a face seal and a radial seal as shown) at each end of the heater core 109, for example. The dual seal arrangement can include a face seal 135 configured to be compressed between the heater core 109 and a respective enclosure plate 125, 127a and/or the inner wall 101a. In certain embodiments, each face seal 135 is not nested in the heater core 109 (e.g., the face seal 135 can be compressed by an angled end of the heater core 109 as shown in FIG. 3, but may not move with the heater core 109). For example, the face seal 135 can be nested within the outer casing 101 (e.g., in a ring slot defined on the inner wall 101a).

The dual seal arrangement at each end of the heater core 109 can include a ring seal 137 nested in a seal channel 139 of the heater core 109. The ring seal 137 can be configured to provide a sealing force less than the face seal 135 to allow the heater core 109 to slide relative to the outer casing 101, for example. The ring seal 137 can be sized to contact and/or compress against that inner wall 101a, but to provide a predetermined frictional force to allow axial sliding of the heater core 109. For example, the frictional force can be selected to provide a suitable liquid seal while also allowing insertion and removal of the heater core 109 (e.g., by hand), while additional sealing can be provided by the face seal 135. The radial seal near plate 125 and the radial seal near plate 127a can be of different diameters to allow the heater core 109 to be inserted without excessive force or wear on the seal. The surface 101a can have a reduced diameter section 101b to accommodate the smaller diameter ring seal, for example.

The dual seal arrangement can have a different sizes at each end of the heater core to allow low friction insertion and removal. The outer casing can include a section of reduced inside diameter for the reduced diameter of one of the ring seals. In certain embodiments the radial seal on one end of the heater core can be of larger diameter, and the radial seal on the opposite end can be of smaller diameter, to allow the heater core to be easily inserted or removed without the force of the radial seal over the length of the heater. A step in the outer case can facilitate the reduction in diameter of the smaller radial seal.

In certain embodiments, the outer casing 101 can include a temperature sensor opening 140 disposed at or near the inlet 105 (e.g., configured to receive a resistance temperature detector (RTD) sensor 141 to sense a temperature of fluid within the flow channel). Any other suitable location, and/or any other suitable instruments and/or ports therefore are contemplated herein. For example, embodiments can also include a second sensor near the outlet to detect the steam temperature.

In certain embodiments, the heater core 109 and the outer casing 101 can be made of aluminum. Any other suitable material is contemplated herein.

Embodiments include a multi-piece assembly, e.g., made of machined aluminum components, that can fasten together. The main body/outer casing can be a block (e.g., square shaped) machined to receive all of the other components. These components include an RTD temperature sensor, thermal switches, water inlet, steam outlet, heater core, end caps and fasteners, for example.

The center bore/inner cavity of the heater block/outer casing can contain the heater core and heater cartridge. The heater core can include the flow path for water and steam. Water can enter the heater block/outer casing through a fitting located on top of the block, and enters the flow area of the core. A helical path can then flow around the heater core and cartridge and leads to the steam outlet. The first section of the flow path can include a geometry designed to create turbulent flow of the incoming water to promote the deposit of scale in these areas. This first section can also have larger cross sectional flow area so that scale buildup does not impede the flow of water/steam. The next portion of the flow path can be helical and can be optimized for improved heat transfer performance and reduced scale sensitivity by providing more than twice the flow area of existing devices, for example. Embodiments can provide more efficient steam production and improved scale resilience.

In certain embodiments, the heater core may utilize a series of walls and single helical flow path, walls and multiple helical flow paths, only walls with decreasing distances between each to increase the steam flow path, or other suitable geometry to promote heat transfer and reduce the impact of scale buildup. The heater core can utilize a radial o-ring seal between the heater core and heater block. A secondary, backup oring seal (e.g., face seal) can be located between each end cap, the heater core and heater block. In the event that the primary o-ring seal fails, for example, the secondary o-ring can provide additional sealing. Fiberglass insulation can be wrapped around the heater block to insulate the heater and reduce the external temperature.

End caps can retain the heater core and the cartridge heater on one end. A plate can be used to retain the heater on the opposite end and can allow easy replacement without disassembling the entire heater assembly. Using disclosed components (e.g., machined or otherwise manufactured) can decrease the component and assembly costs, and allows for component replacement or cleaning when necessary to reduce maintenance cost.

The water and steam flow path between the heater core and heater block can be sealed on both ends by o-rings. The o-rings can sit within channels at each end of the heater core and seal against the heater block. Embodiments allow the heater block to be completely disassembled within the unit for cleaning or replacement, and decreases operating costs by minimizing replacements of the entire assembly. The RTD temperature sensor location can be optimized to improve response to temperature changes, and reduce temperature overshoot during heat up. The combination of a more efficient heater design and better thermal response results in decreased heater temperature set point, and decreased external temperature of the heating system (e.g., for an espresso maker).

Embodiments of a flow path can generally provide a larger flow area in the first section of the heater core to allow for scale buildup without flow restriction. This can transition to a reduced flow area to promote heat transfer in one or more steps along the axial length of the heater core. This promotes the buildup of scale in areas with large flow areas so that flow is less impacted, but still provides sufficient heat transfer for high steam quality. The flow path can be defined by rings, and/or spirals, and/or any other suitable geometry.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A froth heater, comprising:
   an outer case defining an inner cavity, an inlet in fluid communication with the inner cavity, and
   an outlet in fluid communication with the inner cavity; and
   a heater core inserted into the inner cavity and configured to form a flow path between an inner wall of the outer case and the heater core between the inlet and the outlet, wherein the heater core includes a core cavity configured to receive a heater therein to heat the heater core,
   wherein the heater core includes a plurality of channels defined on an outer diameter thereof including a first channel and a second channel, wherein the flow path is defined by the inner wall of the outer case and the plurality of channels, wherein the plurality of channels are circumferentially defined around the heater core, wherein the first channel includes circumferential rings in fluid communication with adjacent circumferential rings via one or more axial passageways defined through dividing walls of the first channel, wherein the circumferential rings are defined in a first axial fraction of the heater core, wherein the second channel includes a spiral channel is-defined at least in a second axial fraction of the heater core.

2. The froth heater of claim 1, further comprising the heater disposed within the core cavity.

3. The froth heater of claim 1, wherein the plurality of channels include a reducing flow area from the inlet toward the outlet.

4. The froth heater of claim 1, wherein the inner cavity is defined through the outer case to form a first opening and a second opening, further comprising a first enclosure plate disposed over the first opening and configured to prevent movement of the heater core and the heater through the first opening.

5. The froth heater of claim 4, further comprising a second enclosure assembly disposed over the second opening and configured to prevent movement of both the heater core and the heater through the second opening in a first state, and to allow the heater to be removed through the second opening while continuing to prevent movement of the heater core through the second opening in a second state.

6. The froth heater of claim 5, wherein the second enclosure assembly includes a wide plate attached to the outer case configured to allow the heater to be removed through the second opening while continuing to prevent movement of the heater core through the second opening, and a narrow plate disposed over the wide plate configured to prevent motion of the heater through the second opening.

7. The froth heater of claim 6, wherein in the first state, the narrow plate is disposed over the wide plate, wherein in the second state, the narrow plate is removed from the wide plate.

8. The froth heater of claim 7, wherein the narrow plate is configured to share one or more shared fasteners with the wide plate, wherein the one or more shared fasteners are less than all fasteners used to attach the wide plate to the outer case such that when the shared fasteners are removed, the narrow plate can be removed from the wide plate while the wide plate remains attached to the outer case.

9. The froth heater of claim 8, wherein the wide plate is attached to the outer case with two independent fasteners, and two shared fasteners diametrically opposed from each other.

10. The froth heater of claim 9, further comprising one or more seals disposed at each end of the heater core to seal the heater core against the first enclosure plate and/or the inner wall at a first end, and to seal the heater core against the wide plate and/or the inner wall at a second end.

11. The froth heater of claim 10, wherein the one or more seals include a dual seal arrangement at each end of the heater core, wherein the dual seal arrangement includes a face seal configured to be compressed between the heater core and a respective enclosure plate and/or the inner wall, wherein the face seal is not nested in the heater core.

12. The front heater of claim 11, wherein the dual seal arrangement at each end of the heater core includes a ring seal nested in a seal channel of the heater core and configured to provide a sealing force less than the face seal to allow the heater core to slide relative to the outer case.

13. The froth heater of claim 12, wherein the dual seal arrangement has different sizes at each end of the heater core to allow low friction insertion and removal.

14. The froth heater of claim 13, wherein the outer case includes a section of reduced inside diameter for the reduced diameter of one of the ring seals.

* * * * *